United States Patent
Jeon et al.

[11] Patent Number: 5,907,543
[45] Date of Patent: May 25, 1999

[54] METHOD FOR ALLOCATING A CALL IN A CDMA BASE STATION

[75] Inventors: Hyoung Goo Jeon; Soo Kun Kwon; Jong Ray Na; Yang Gi Kang; Jee Hwan Ahn, all of Taejon-Shi, Rep. of Korea

[73] Assignee: Electronics And Telecommunications Research Institute, Taejon-Shi, Rep. of Korea

[21] Appl. No.: 08/826,200

[22] Filed: Mar. 27, 1997

[30] Foreign Application Priority Data

Apr. 24, 1996 [KR] Rep. of Korea ............... 96-12718

[51] Int. Cl.⁶ .......................... H04B 7/26; H04J 13/00
[52] U.S. Cl. ........................ 370/335; 455/63; 455/452
[58] Field of Search .................. 370/252, 328, 370/329, 331, 335, 342, 441; 375/200, 206; 455/422, 517, 63, 67.1, 67.3, 452, 450, 455, 436

[56] References Cited

U.S. PATENT DOCUMENTS

| | | | |
|---|---|---|---|
| 5,687,171 | 11/1997 | Shin et al. | 370/335 |
| 5,697,053 | 12/1997 | Hanly | 455/67.3 |
| 5,708,969 | 1/1998 | Kotzin et al. | 455/63 |
| 5,734,646 | 3/1998 | I et al. | 370/335 |

*Primary Examiner*—Chi H. Pham
*Assistant Examiner*—Ricky Q. Ngo
*Attorney, Agent, or Firm*—Cohen, Pontani, Lieberman & Pavane

[57] ABSTRACT

This invention is directed to a method for allocating a call in a CDMA base station. Whenever the base station receives a report of the change in the transmission power from channel processors, the level of interference affecting neighboring cells by a cell of its own is measured. In addition, when a new call is attempted, upon comparing the measured level of interference with a predetermined reference level (a threshold value) of interference, it is determined whether a call is allowed (i.e, allocated) or not dependent on a distance between the mobile station and the base station.

3 Claims, 3 Drawing Sheets

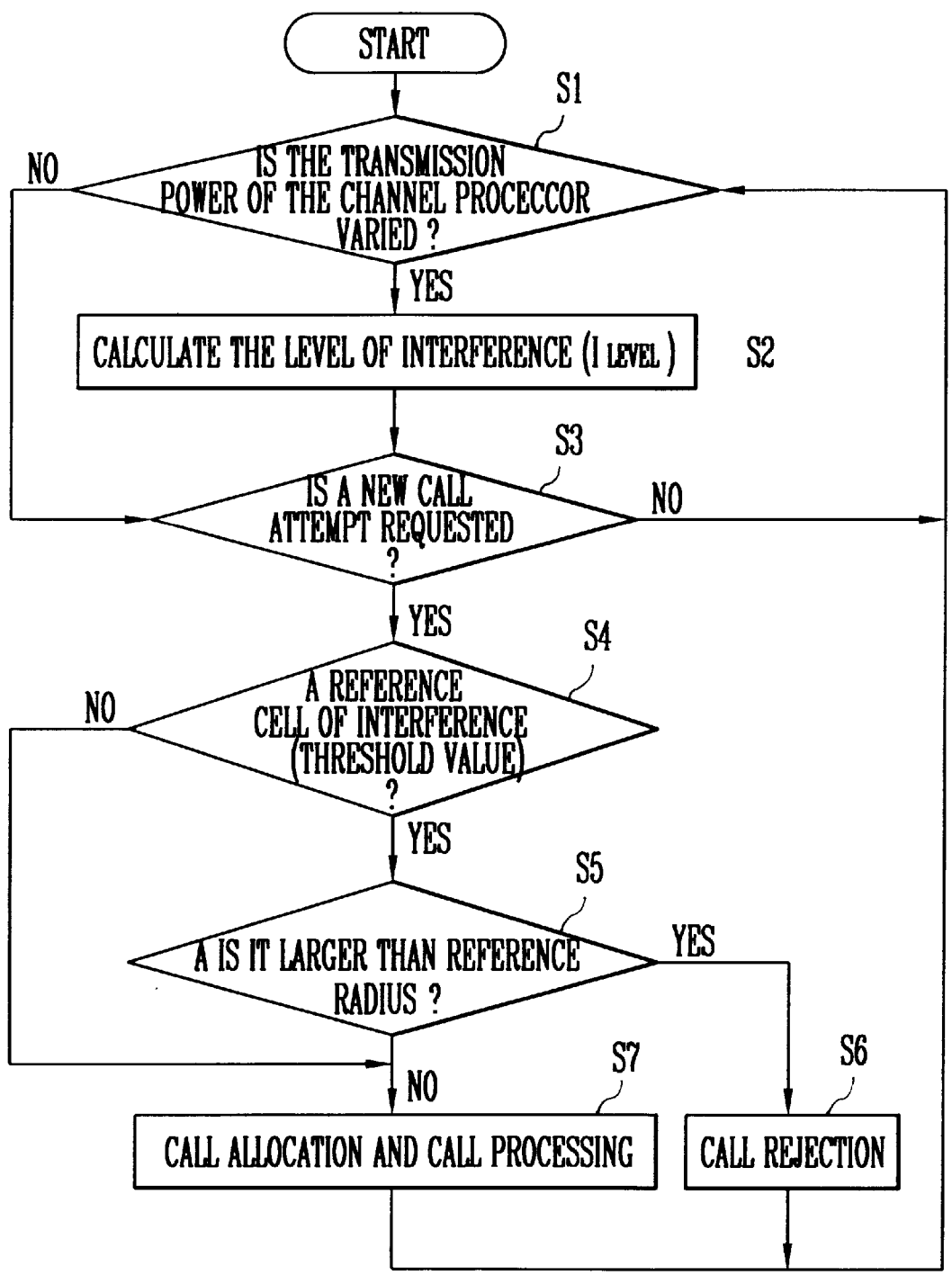

METHOD FOR ALLOCATING A CALL IN A CDMA BASE STATION

BACKGROUND OF THE INVENTION

1. Field of the Invention

This invention relates to a method for allocating a call in a CDMA (Code Division Multiple Access) base station, and more particularly to a method for allocating a call to lower a level of interference affecting adversely neighboring cells in a CDMA base station.

2. Description of a Prior Art

In a conventional CDMA mobile communication system, an amount (level) of interference affecting adversely neighboring cell was increased by power transmitted from a mobile station at a boundary between cells.

For the purpose of illustrating this, FIG. 1 shows a level of interference in a neighboring cell dependent on a distance between a mobile station and a base station.

As shown in FIG. 1, the farther a mobile station communicating with a service base station 21 of a current servicing cell 20 gets away from the base station 21, for example like case of a mobile station m1 31, the nearer the mobile station comes to a neighboring base station 11 of a neighboring cell 10. Therefore, transmission power required for the communication between the base station and the mobile station is more consumed.

To the contrary, as the service base station 21 and the mobile station grows close one another, for example like case of a mobile station m2 32, the mobile station grows far away to the neighboring cell 10, which results in the consumption of less transmission power.

A strength of such a transmission power required for the communication between the base station and the mobile station is attenuated with inverse proportion to the fourth power of the distance. Therefore, as the mobile station grows closer to the neighboring cell 10 and thereby the transmission power of the mobile station grew stronger, a level of interference affecting adversely the neighboring cell grows high. More specifically, there was the problem that the higher level of interference is, the less the maximum capacity of call in the neighboring cell.

SUMMARY OF THE INVENTION

In order to overcome the problem, it is therefore an object of this present to provide a method for allocating a call in a CDMA base station to lower a level of interference affecting adversely neighboring cells in the CDMA base station so that the over-all call capacity of a communication system is increased.

Here, the transmission power transmitted from the base station to the mobile station is received via a forward link of the base station. More specifically, a base station controller receives the amount of the change in transmission power to send a signal to each mobile station via a channel processor of the base station as shown in FIG. 2.

For the purpose of accomplishing the object, according to an embodiment of this invention, a method for allocating a call in a service base station comprises the steps of: measuring a level of interference affecting adversely neighboring cells based on the amount of the change in power to send a signal to each mobile station of a current service cell to the service base station; and allocating a call based on an adjacent distance order to the service base station when a new call is attempted in the case where a level of interference affecting adversely neighboring cells is measured to be higher than a predetermined reference level of interference, wherein a level of interference on a backward link of a neighboring base station in a neighboring cell is lowered to increase the over-all call capacity of a communication system.

Furthermore, according to an aspect of this invention, the method is characterized in that the step of allocating a call comprises the steps of: determining whether the measured level of interference is higher or not than the predetermined reference level of interference; estimating the distance between the base station and a new call by using the round trip delay(RTD); determining whether the measured level of interference is higher or not than the predetermined level of interference; rejecting the attempted call if it is determined that the distance from cell site is larger than the predetermined reference radius; and allowing the call if it is determined that the distance is smaller than the predetermined reference radius.

In other words, an allocation of a call in the base station is made in a manner that a call generated in a mobile station far away from the base station is limited and a call generated in a mobile station near the base station which interferes little in other neighboring cells is allowed with a

BRIEF DESCRIPTION OF THE DRAWINGS

The present invention will be more clearly understood from the description as set forth below, with reference to the accompanying drawings, wherein:

FIG. 4 is a flowchart for illustrating a method for allocating a call in a CDMA base station, according to the present invention.

DETAILED DESCRIPTION OF THE PREFERRED EMBODIMENT

Hereinafter, the present invention will be described by way of example with reference to the accompanying drawings.

Prior to the description, when an amount of transmission power from a base station to a mobile station is expressed $\Phi_i$ (i=1, ..., n), the farther the mobile station is away from the base station, the more the transmission power $\Phi_i$ is required by the base station.

To the contrary, from point of statistics, if the transmission power $\Phi_i$ from the base station to the mobile station is large, it can be said that the mobile station is far away from a service cell and closer to a neighboring cell compared to other mobile station within the service cell to thereby interfere more in the neighboring cell.

Needless to say, because a mobile station with a week transmission power $\Phi_i$ is far away from a neighboring cell, it can be said that the level of interference by the mobile station affecting the neighboring cell is by far less than that by other mobile station close to the neighboring cell.

Figure 1A:
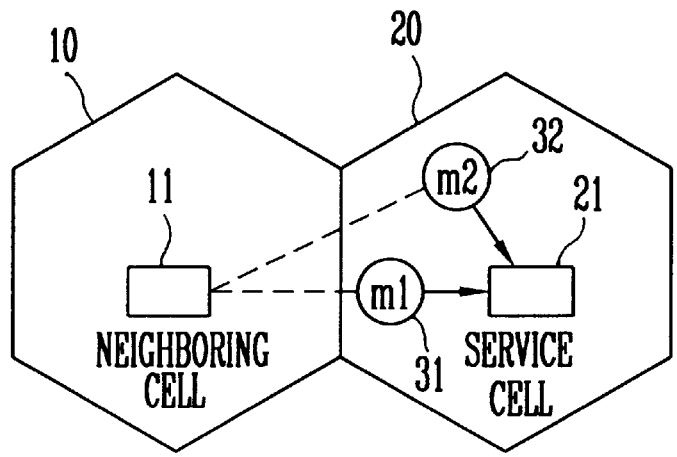
FIG. 1 is a explanation view for explaining a level of interference in a neighboring cell dependent on a distance of a mobile station and a base station.
Figure 1B:
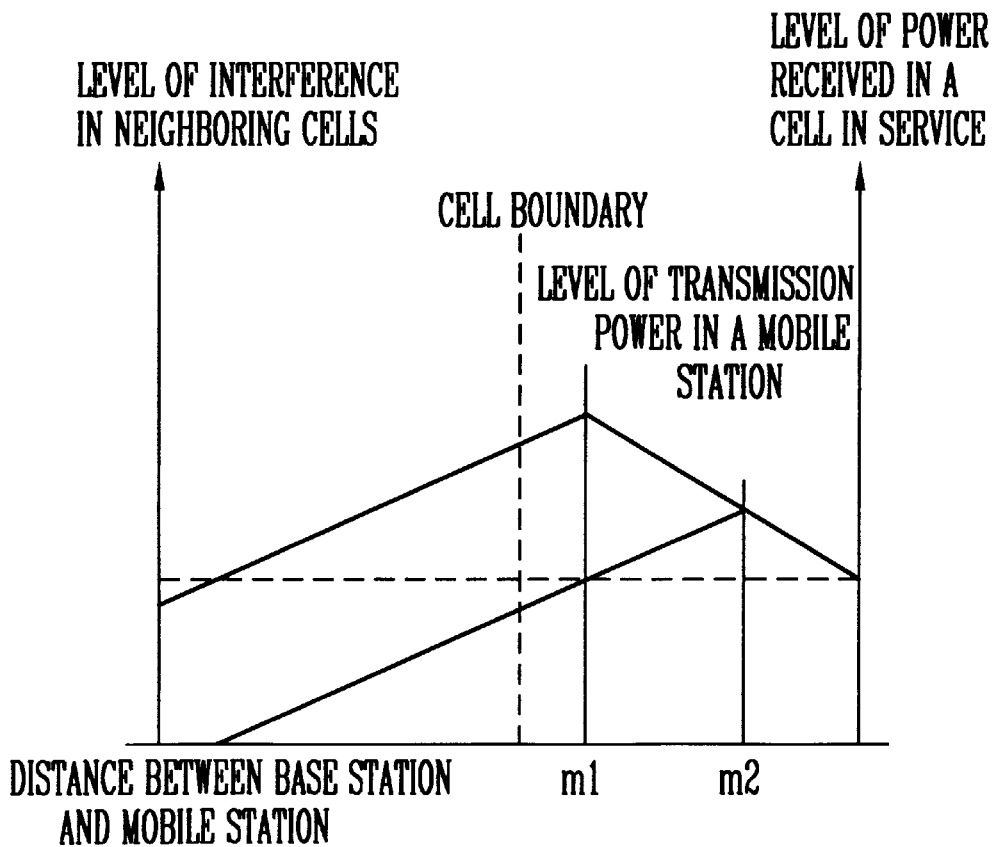
Figure 2:
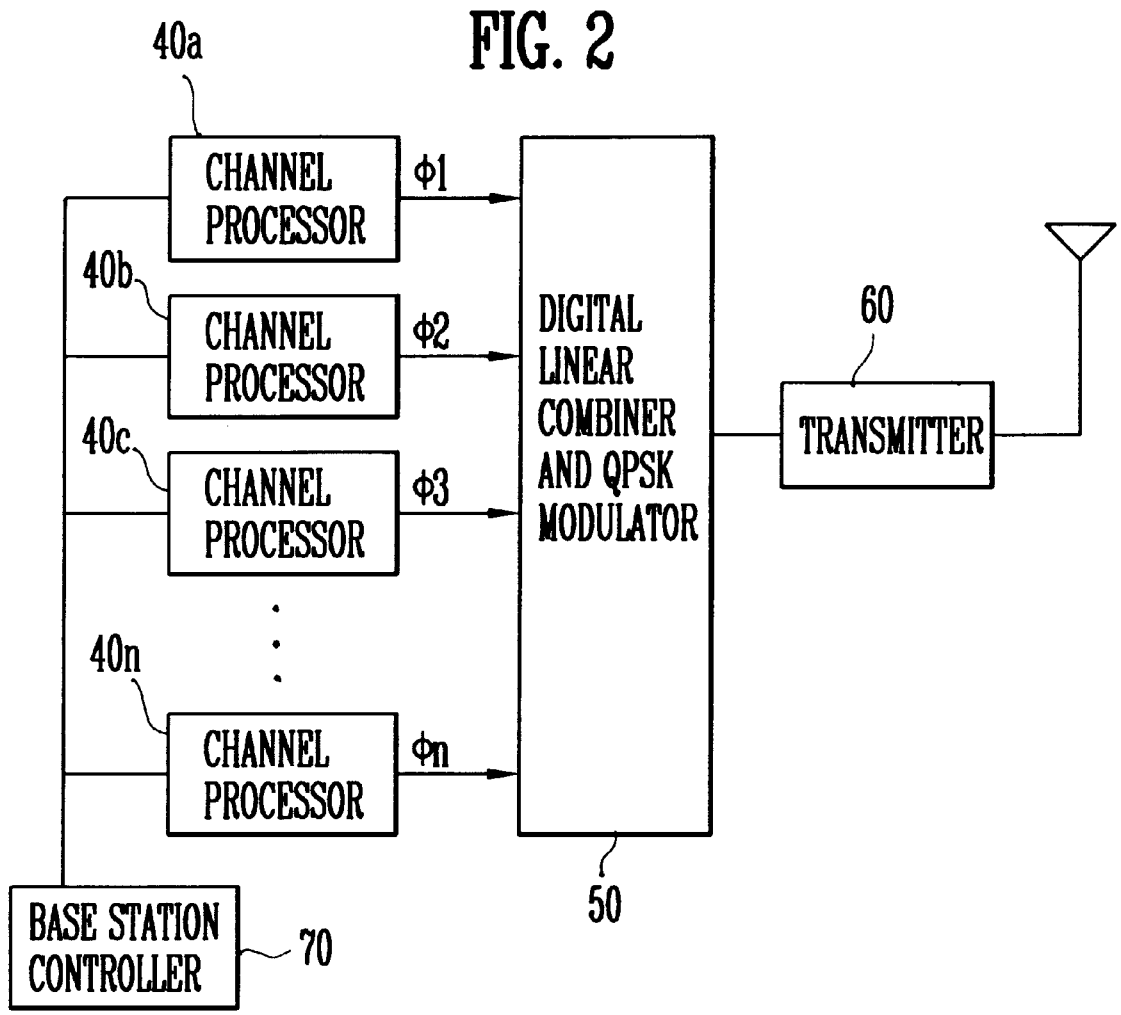
FIG. 2 is a general forward link structure of a base station according to the present invention.

FIG. 2 shows a general forward link structure of a base station according to the present invention. The forward link structure is composed of multiple channel processors 40a–40n, a digital linear combiner and QPSK modulator 50, a transmitter 60, and a base station controller 70.

With such a construction, the multiple channel processor 40a–40n report a current transmission power $\Phi_i$ to the base station controller 70 whenever the transmission power $\Phi_i$ of each mobile station is varied.

The transmission power from the multiple channel processor 40a–40b is combined and modulated in the digital linear combiner and QPSK modulator 50 and then transmitted via the transmitter 60.

Such a base station controller 70 manages the level of the transmission power $\Phi_i$ of each call currently progressing in the cell of its own.

In addition, whenever the base station controller 70 receives a report of the change in the level of the transmission power $\Phi_I$ from the channel processors, it calculates the level of interference $I_{LEVEL}$ affecting neighboring cells by the cell of its own according to the following expression.

$$I_{LEVEL} = \sum_{i=1}^{n} \Phi i \quad (1)$$

where, n represents the number of call currently progressing.

If the level of interference $I_{LEVEL}$ is high, it shows that the cell of interest interferes much in other neighboring cells. Therefore, the base station controller 70 should manage the call so that an increase in the level of interference can be suppressed. To this end, as shown in FIG. 3, the base station controller 70 should limit a call from the mobile station far away from the base station, but allow a call generated in the mobile station close to the base station such that the mobile station interferes little in other neighboring cells.

Figure 3:
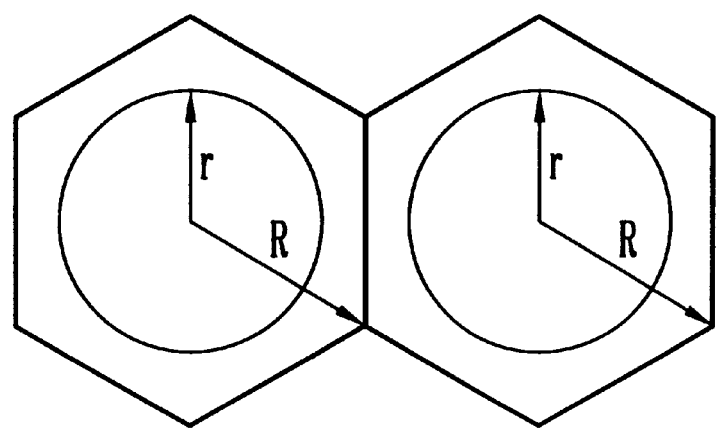
FIG. 3 is a view of a call attempt possible radius when a level of interference affecting a neighboring cell is large.

"r" in FIG. 3 represents a reference radius a call is allowed when the level of interference affecting neighboring calls is high.

"R" in FIG. 3 represents a radius of cell.

FIG. 4 shows a flowchart for illustrating a method for allocating the call according to the present invention.

Referring to FIG. 4, first of all, it is determined at the channel processors of the base station whether the transmission power is varied S1.

At the determination step S1, if it is determined that the transmission power is varied, a level of interference $I_{LEVEL}$ is calculated S2.

Thereafter, the base station determines whether a new call is attempted S3. At this determination step S3, if it is determined that the new call is generated, it is determined whether the level of interference calculated in the step S2 is higher or not than a threshold value (a reference level of interference) S4.

If it is determined that the calculated level of interference is not higher than the threshold value at the step S4, an accessing call is unconditionally allocated as long as spare channels exist and then the base station performes call processing S7.

On the other hands, if it is determined that the calculated level of interference is higher than the threshold value at the step S4, it is determined whether the distance between the mobile station and the base station is larger or not than a predetermined call allowance reference radius r S5 by using the RTD value calculated from the call.

If it is determined that the distance r is larger than the predetermined reference radius r, the call is rejected or blocked. If not so, the call is allowed (i.e., allocated) S7.

It is here noted that the call allowance includes concretely the operation of allocating and then processing the call.

As described above, the CDMA base station measures the level of interference affecting neighboring cells by a cell of its own and, when a new call is attempted, determines whether the call is allowed or not.

In addition, when the new call is attempted, the call is limited dependent on the distance between the mobile and the base station.

As is apparent from the above description, this invention has effects as follows.

Firstly, because a cell interferes little in neighboring cells, the over-all capacity of the system can be increased.

Secondly, because a mobile station closer to the base station has priority in the allocation of call, an amount of transmission power to be transmitted by the mobile station can be reduced.

In addition, an amount of transmission power to be transmitted by the base station can be reduced.

Thirdly, because multiple mobile station can share the capacity of limited transmission power of the base station, a forward capacity of the whole system is increased.

What is claimed is:

1. A method for allocating a call in a CDMA base station, comprising the steps of:

measuring a level of interference affecting adversely neighboring cells based on the change in power to be transmitted to each mobile station of a current service cell from a service base station; and allocating a call based on an adjacent distance order to the service base station when a new call is attempted in the case where a level of interference affecting adversely neighboring cells is measured to be higher than a predetermined reference level of interference, wherein a level of interference on a backward link of a neighboring base station in a neighboring cell is lowered to increase the over-all call capacity of a communication system.

2. The method as set forth in claim 1, wherein the step of allocating a call comprises the steps of:

determining whether the measured level of interference is higher or not than the predetermined reference level of interference;

determining whether the distance between mobile and a base station by a round trip delay is larger or not than a predetermined reference radius(r) if it is determined that the measured level of interference is higher than the predetermined level of interference;

interrupting the attempted call if it is determined that the distance is larger than the predetermined reference radius(r); and allowing the call if the distance is smaller than the predetermined reference radius(r).

3. The method as set forth in claim 2, wherein the step of allowing the call comprises allocating and then processing the call.

* * * * *